(12) United States Patent
Taylor et al.

(10) Patent No.: US 9,992,217 B2
(45) Date of Patent: Jun. 5, 2018

(54) METHODS, SYSTEMS, AND COMPUTER READABLE MEDIA FOR DETECTING MALICIOUS NETWORK TRAFFIC

(71) Applicant: The University of North Carolina at Chapel Hill, Chapel Hill, NC (US)

(72) Inventors: Teryl Paul Taylor, Durham, NC (US); Kevin Zachary Snow, Cary, NC (US); Nathan Michael Otterness, Mebane, NC (US); Fabian Newman Monrose, Chapel Hill, NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 0 days. days.

(21) Appl. No.: 15/396,114

(22) Filed: Dec. 30, 2016

(65) Prior Publication Data

US 2017/0195353 A1     Jul. 6, 2017

Related U.S. Application Data

(60) Provisional application No. 62/273,809, filed on Dec. 31, 2015.

(51) Int. Cl.
*H04L 29/06* (2006.01)
*G06F 12/0813* (2016.01)
(Continued)

(52) U.S. Cl.
CPC ...... *H04L 63/1425* (2013.01); *G06F 12/0813* (2013.01); *H04L 43/08* (2013.01); *H04L 63/166* (2013.01); *H04L 67/02* (2013.01); *H04L 67/2842* (2013.01); *G06F 2212/154* (2013.01); *G06F 2212/60* (2013.01); *G06F 2212/62* (2013.01)

(58) Field of Classification Search
None
See application file for complete search history.

(56) References Cited

U.S. PATENT DOCUMENTS 9,355,246 B1 *  5/2016  Wan ................. G06F 21/566
2012/0304244 A1 * 11/2012  Xie ................... G06F 21/00
726/1

(Continued)

OTHER PUBLICATIONS

Nazario, "PhoneyC: A Virtual Client Honeypot", In Proc. of USENIX Workshop on Large-Scale Exploits and Emergent Threats, 2009, pp. 1-8. (Year: 2009).*

(Continued)

*Primary Examiner* — Benjamin E Lanier
(74) *Attorney, Agent, or Firm* — Jenkins, Wilson, Taylor & Hunt, P.A.

(57) ABSTRACT

Methods, systems, and computer readable media for detecting malicious network traffic are disclosed. According to one method, the method includes caching network traffic transmitted between a client and a server, wherein the network traffic includes a uniform resource locator (URL) for accessing at least one file from the server. The method also includes determining whether the at least one file is suspicious. The method further includes in response to determining that the at least one file is suspicious, determining whether the at least one file is malicious by replaying the network traffic using an emulated client and an emulated server.

20 Claims, 6 Drawing Sheets

(51) Int. Cl.
*H04L 29/08* (2006.01)
*H04L 12/26* (2006.01)

(56) References Cited

U.S. PATENT DOCUMENTS

| | | | | |
|---|---|---|---|---|
| 2016/0006698 | A1* | 1/2016 | Kushwaha | H04L 63/1408 726/12 |
| 2016/0164761 | A1* | 6/2016 | Sathyanarayana | H04L 65/60 709/219 |
| 2017/0163538 | A1* | 6/2017 | Feng | H04L 45/24 |

OTHER PUBLICATIONS

Acar et al., "FPDetective: Dusting the Web for Fingerprinters," Proceedings of the ACM SIGSAC Conference on Computer and Communications Security pp. 1-13 (2011).
Bailey et al., "Automated Classification and Analysis of Internet Malware," Recent Advances in Intrusion Detection, Springer, pp. 178-197 (2007).
Blum et al., "Lexical Feature Based Phishing URL Detection Using Online Learning," Proceedings of the ACM Workshop on Artificial Intelligence and Security pp. 54-60(2010).
Canali et al., "Prophiler: A Fast Filter for the Large-Scale Detection of Malicious Web Pages," Proceedings of the Conference on World Wide Web pp. 1-10 (2011).
Cova et al., "Detection and Analysis of Drive-By-Download Attacks and Malicious JavaScript Code," Proceedings of the Conference on World Wide Web pp. 1-10(2010).
De Maio et al., "PExy: The Other Side of Exploit Kits," Proceedings of the Conference on Detection of Intrusions and Malware, and Vulnerability Assessment pp. 1-18 (2014).
Eshete et al., "Webwinnow: Leveraging Exploit Kit Workflows to Detect Malicious URLs," Proceedings of the ACM Conference on Data and Application Security and Privacy pp. 305-312 (2014).
Gassen et al., "Honeyagent: Detecting Malicious Java Applets by Using Dynamic Analysis," International Conference on Malicious and Unwanted Software: The Americas (MALWARE) pp. 109-117 (2014).
Grier et al., "Manufacturing Compromise: The Emergence of Exploitation-As-A-Service," Proceedings of the ACM Conference on Computer and Communications Security pp. 1-12 (2012).
Invernizzi et al., "Evilseed: A Guided Approach to Finding Malicious Web Pages," Proceedings of the IEEE Symposium on Security and Privacy pp. 1-15 (May 2012).
Kirat et al., "Barebox: Efficient Malware Analysis on Bare-Metal," Proceedings of the 27th Annual Computer Security Applications Conference, pp. 1-10 (2011).
Kirat et al., "Barecloud: Bare-Metal Analysis-Based Evasive Malware Detection," Proceedings of the 23rd USENIX Conference on Security Symposium, pp. 1-10 (2014).
Kornblum, "Identifying Almost Identical Files Using Context Triggered Piecewise Hashing," Digital Investigation, vol. 3, Supplement pp. S91-S97 (2006).
Li et al., "Knowing Your Enemy: Understanding and Detecting Malicious Web Advertising," Proceedings of the ACM Conference on Computer and Communications Security pp. 1-13(2012).
Li et al., "Finding the Linchpins of the Dark Web: A Study on Topologically Dedicated Hosts on Malicious Web Infrastructures," Proceedings of the IEEE Symposium on Security and Privacy pp. 1-15 (May 2013).
Lindorfer et al., "Detecting Environment-Sensitive Malware," Proceedings of the 14th International Conference on Recent Advances in Intrusion Detections, Springer-Verlag pp. 338-357 (2011).
Ma et al., "Beyond Blacklists: Learning to Detect Malicious Web Sites from Suspicious URLs," Proceedings of the Conference on Knowledge Discovery and Data Mining pp. 1-9(2009).
Ma et al., "Learning to Detect Malicious URLs," ACM Transactions on Intelligent Systems Technology, vol. 2, No. 3 pp. 1-24 (May 2011).
Maier et al., "Enriching Network Security Analysis with Time Travel," Proceedings of the ACM SIGCOMM 2008 Conference on Data Communication, ACM pp. 1-12 (2008).
Mekky et al., "Detecting Malicious HTTP Redirections Using Trees of User Browsing Activity," Proceedings of IEEE INFOCOM pp. 1159-1167(Apr. 2014).
Mourad, "Sleeping Your Way out of the Sandbox," SANS Institute InfoSec Reading Room, SANS Institute, pp. 1-22 (2015).
Paxson, "Bro: A System for Detecting Network Intruders in Real-Time," Computer Networks, vol. 31, No. 23-24 pp. 1-22 (1999).
Polychronakis et al., "Comprehensive Shellcode Detection Using Runtime Heuristics," Annual Computer Security Applications Conference pp. 1-10(2010).
Provos et al., "The Ghost in the Browser Analysis of Web-Based Malware," Proceedings of the Workshop on Hot Topics in Understanding Botnets pp. 1-9 (2007).
Provos et al., "All Your iFRAMEs Point to Us," Proceedings of the USENIX Security Symposium pp. 1-15 (2008).
Rieck et al., "Cujo: Efficient Detection and Prevention of Drive-By-Download Attacks," Proceedings of the Computer Security Applications Conference pp. 1-9 (2010).
Roesch et al., "Snort: Lightweight Intrusion Detection for Networks," LISA, vol. 99, No. 1, pp. 229-238 (1999).
Schlumberger et al., "Jarhead Analysis and Detection of Malicious Java Applets," Proceedings of the 28th Annual Computer Security Applications Conference, ACM, New York, NY, USA pp. 1-10 (2012).
Snow et al., "Shellos: Enabling Fast Detection and Forensic Analysis of Code Injection Attacks," 20th USENIX Conference on Security pp. 1-16 (2011).
Stancill et al., "Check My Profile: Leveraging Static Analysis for Fast and Accurate Detection of ROP Gadgets," Symposium on Recent Advances in Intrusion Detection pp. 1-20 (2013).
Stock et al., "Kizzle: A Signature Compiler for Exploit Kits," Microsoft Research, Tech. Rep. MSR-TR-2015-12 pp. 1-12 (Feb. 2015).
Stringhini et al., "Shady Paths: Leveraging Surfing Crowds to Detect Malicious Web Pages," Proceedings of the ACM Conference on Computer and Communications Security pp. 1-12 (2013).
Thomas et al., "Ad Injection at Scale: Assessing Deceptive Advertisement Modifications," IEEE Symposium on Security and Privacy pp. 1-17 (2015).
Van Overveldt et al., "Flashdetect: Actionscript 3 Malware Detection," Proceedings of the 15th International Conference on Research in Attacks, Intrusions, and Defenses, Springer-Verlag pp. 1-12 (2012).
Wang et al., "Cloak and Dagger: Dynamics of Web Search Cloaking," Proceedings of the 18th ACM Conference on Computer and Communications Security pp. 1-13 (2011).
Wang et al., "Detecting Malicious Landing Pages in Malware Distribution Networks," Proceedings of Dependable Systems and Networks pp. 1-11 (2013).
Kronzy, "Advanced Exploitation of Internet Explorer 10 on Windows 8/Pwn2Own 2013 Exploit," Romanian Security Team, https://rstforums.com/forum/topic/87813-advanced-exploitation-of-internet-explorer-10-on-windows-8-pwn2own-2013-exploit/, pp. 1-10 (2014).

* cited by examiner

```
1  AdfRSfDF=document;
2  ....
3  CgRTO='write';
4
5  AdfRSfDF[CgRTO]('Hello World');
```

FIG. 3

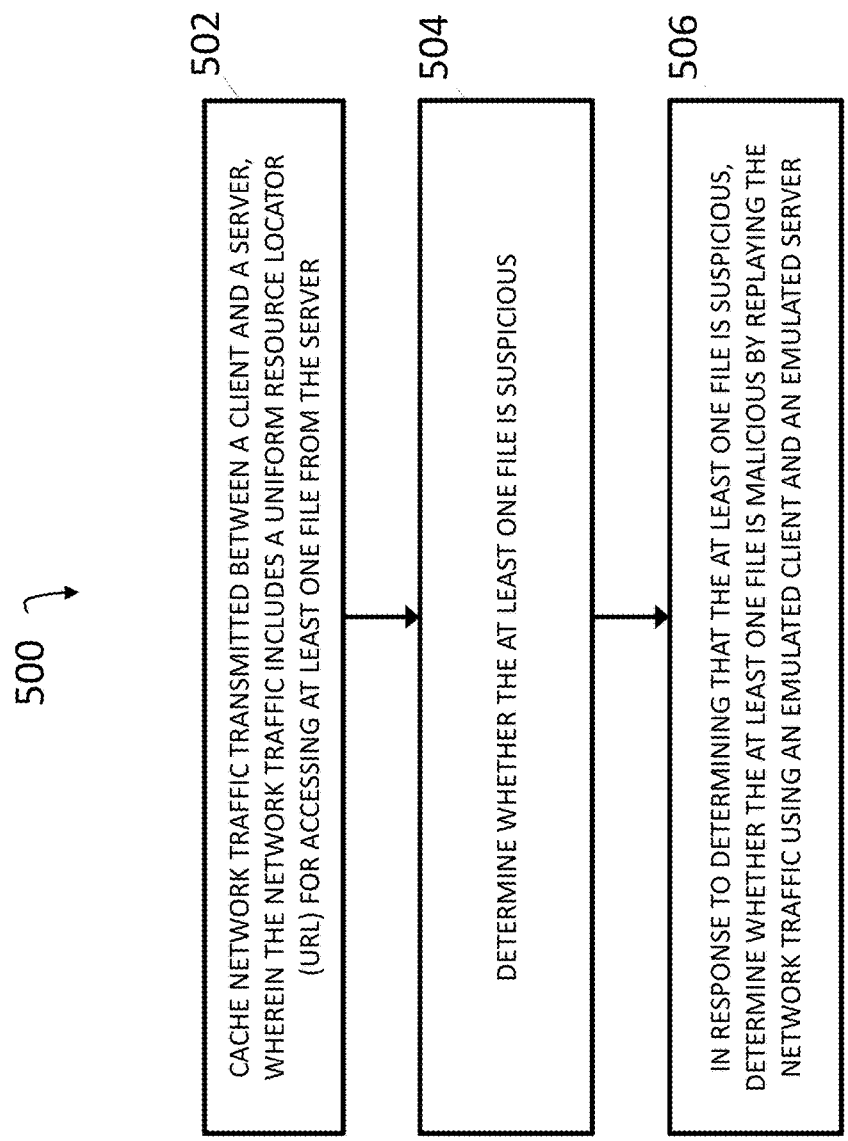

METHODS, SYSTEMS, AND COMPUTER READABLE MEDIA FOR DETECTING MALICIOUS NETWORK TRAFFIC

PRIORITY CLAIM

The present application claims the benefit of U.S. Patent Application Ser. No. 62/273,809, filed Dec. 31, 2015, the disclosure of which is incorporated herein by reference in its entirety.

GOVERNMENT INTEREST

This invention was made with government support under Grant No. CNS-1421703 awarded by the National Science Foundation. The government has certain rights in the invention.

TECHNICAL FIELD

The subject matter described herein relates to computer security. More specifically, the subject matter relates to methods, systems, and computer readable media for detecting malicious network traffic.

BACKGROUND

Today's sophisticated web exploit kits use polymorphic techniques to obfuscate each attack instance, making content-based signatures used by network intrusion detection systems far less effective than in years past. A dynamic analysis, or honeyclient analysis, of these exploits plays a key role in initially identifying new attacks in order to generate content signatures. While honeyclients can sweep the web for attacks, these honeyclients generally take significant resources to implement and any blacklists generated from these sweeps may take days or even weeks to reach network operators. This leaves network operators dependent on third-party signatures that arrive too late, or not at all.

Accordingly, there exists a need for improved methods, systems, and computer readable media for detecting malicious network traffic.

SUMMARY

Methods, systems, and computer readable media for detecting malicious network traffic are disclosed. According to one method, the method includes caching network traffic transmitted between a client and a server, wherein the network traffic includes a uniform resource locator (URL) for accessing at least one file from the server. The method also includes determining whether the at least one file is suspicious. The method further includes in response to determining that the at least one file is suspicious, determining whether the at least one file is malicious by replaying the network traffic using an emulated client and an emulated server.

According to one system, the system includes at least one processor, a memory, and a malicious traffic detection module (MTDM) implemented using the at least one processor and the memory. The MTDM is configured to cache network traffic transmitted between a client and a server, wherein the network traffic includes a URL for accessing at least one file from the server, to determining whether the at least one file is suspicious, and in response to determining that the at least one one file is suspicious, to determine whether the at least one file is malicious by replaying the network traffic using an emulated client and an emulated server.

The subject matter described herein can be implemented in software in combination with hardware and/or firmware. For example, the subject matter described herein can be implemented in software executed by a processor. In one exemplary implementation, the subject matter described herein may be implemented using a computer readable medium having stored thereon computer executable instructions that when executed by the processor of a computer cause the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the terms "node" and "host" refer to a physical computing platform or device including one or more processors and memory.

As used herein, the term "module" refers to hardware, firmware, or software in combination with hardware and/or firmware for implementing features described herein.

BRIEF DESCRIPTION OF THE DRAWINGS

The subject matter described herein will now be explained with reference to the accompanying drawings of which:

FIG. 3 is a JavaScript snippet depicting obfuscation of a function call;

FIG. 5 is a diagram illustrating a process for detecting malicious network traffic according to an embodiment of the subject matter described herein.

DETAILED DESCRIPTION

Figure 1:
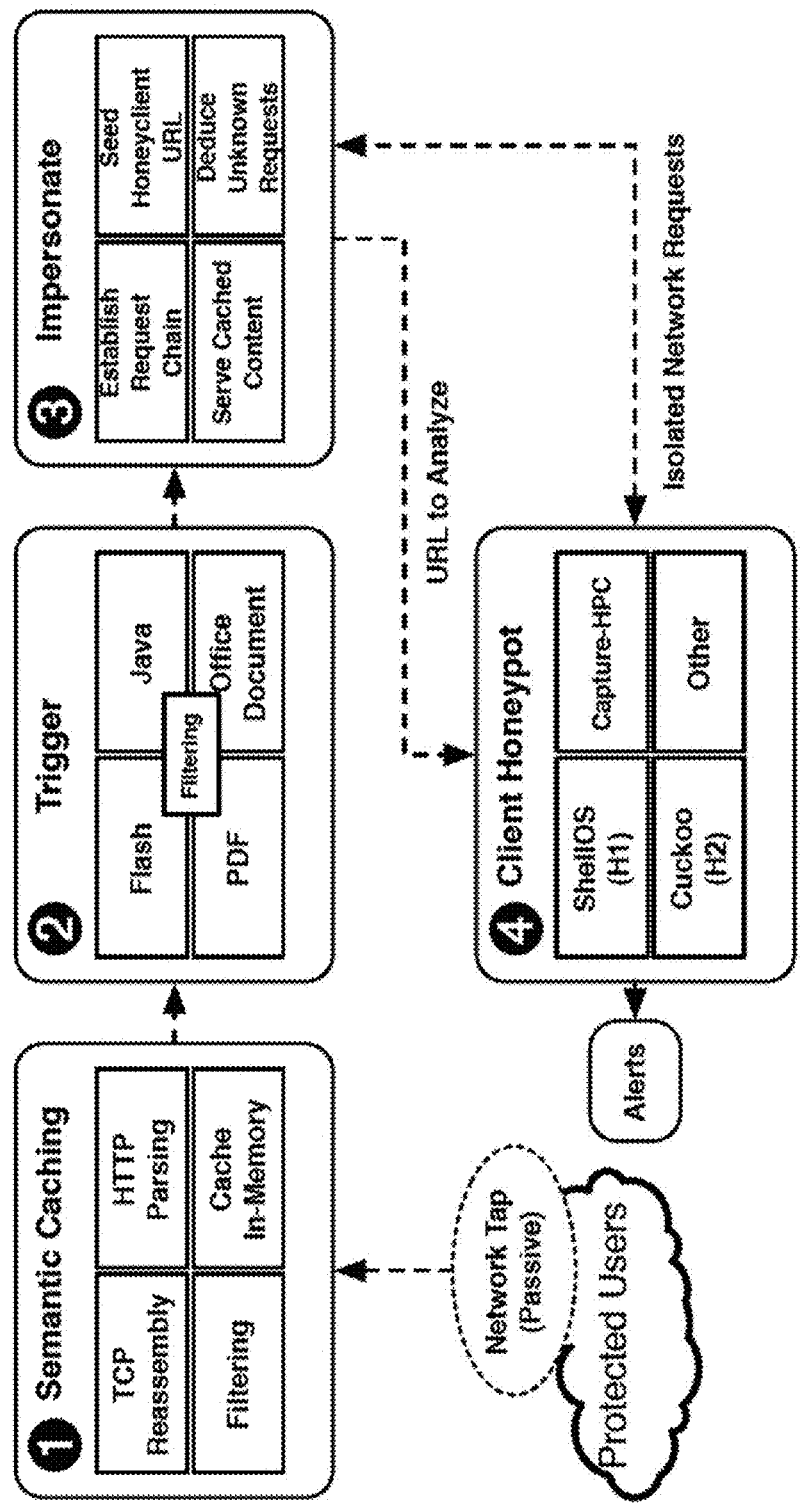
FIG. 1 is a diagram illustrating a high level overview of a malicious traffic detection workflow according to an embodiment of the subject matter described herein.

Today's sophisticated web exploit kits use polymorphic techniques to obfuscate each attack instance, making content-based signatures used by network intrusion detection systems far less effective than in years past. A dynamic analysis, or honeyclient analysis, of these exploits plays a key role in initially identifying new attacks in order to generate content signatures. While honeyclients can sweep the web for attacks, they provide no means of inspecting end-user traffic on-the-wire to identify attacks in real time. This leaves network operators dependent on third-party signatures that arrive too late, or not at all.

The subject matter described herein includes various aspects of a novel framework for adapting honeyclient-based systems to operate on-the-wire at scale. Specifically, we capture and store a configurable window of reassembled hypertext transfer protocol (HTTP) objects network wide, use lightweight content rendering to establish the chain of requests leading up to a suspicious event, then serve the initial response content back to the honeyclient system on an isolated network. We demonstrate the power of our framework by analyzing a diverse collection of web-based exploit kits as they evolve over a one year period. We provide insights into the behavior of these exploit kits. Additionally, our empirical evaluations suggest that our approach offers significant operational value, and a single honeyclient server can readily support a large enterprise.

I. INTRODUCTION

The rapid and wide-spread proliferation of browser based exploits distributed via highly obfuscated web content is an all too familiar event. Sophisticated off-the-shelf exploitation toolkits detect vulnerabilities in victim's browsers and plugins prior to exploitation and use this information to dynamically and uniquely craft the next stage of attack, ultimately injecting highly targeted malicious code on the victim system. More concerning is that these kits can deliver malware without our knowledge while visiting legitimate sites; for example, by either identifying and exploiting vulnerabilities in a multitude of web servers, or simply launching massive campaigns through advertising networks that monetize these sites and injecting redirections to their malicious web servers.

The status quo in defending networks from these attacks is the use of network intrusion detection systems (NIDS) that perform deep packet inspection to search HTTP traffic as it passes a network border. These systems perform signature matching, blacklisting, or statistical analysis to identify potentially malicious traffic. Sadly, attackers routinely thwart these defenses by rapidly changing their environment through
  1.) using polymorphic techniques on exploit payloads,
  2.) frequently moving exploit kits to new servers,
  3.) constantly changing domain names, and
  4.) morphing traffic to bypass signatures in an effort look "normal" in the context of surrounding traffic.

Of late, honeyclient analysis has been used to address some of the aforementioned weaknesses, especially as it relates to detecting web exploit kits. The idea is to use a secure virtualized machine (VM) to navigate, render and execute potentially malicious web pages. Honeyclients dynamically track system state change caused by a specific application or website. System state change (e.g., files written, processes created, etc.) has been shown to be an effective metric in classifying malicious applications [2]. Today, many security vendors routinely crawl the Internet with large clusters of VMs in an attempt to identify malicious websites [32, 9]. The result of these analyses is typically used to generate blacklists or other information deemed useful for improving a network's security posture.

However, the model of honeyclient analysis is not without drawbacks. Crawlers heavily depend on the quality of the URL seeding used to initially discover potentially malicious web pages, and there is no guarantee that crawlers will discover the same exploit kits that are visited by third-parties using a NIDS. Deploying any generated signatures can take days or weeks, often too late to be of use. Further, attackers use so-called cloaking techniques that redirect known crawlers to benign websites. Honeyclients also suffer from a number of other debilitating problems (as discussed later in more detail). For example, honeyclients are less effective if their system configuration does not match that of the targeted victim (e.g., an exploit targeting Internet Explorer 11 will not be detected if the honeyclient is configured with Internet Explorer 10). Finally, honeyclients are notorious for requiring non-trivial amounts of time to complete a single analysis—easily on the order of minutes. For our purposes, such prohibitively long processing times make them poorly suited for live operational deployments. Indeed, Adobe Flash vulnerabilities have dominated other attack vectors in the last 2 years, but remain difficult to analyze dynamically due to their sheer volume, exceeding hundreds of files per minute on our campus network.

Motivated by a real operational need to tackle the threats posed by the significant rise in Flash-based attacks, we present a framework that enables one to adapt an arbitrary honeyclient system to function on-the-wire without the aforementioned drawbacks. One potential operational challenge for such analysis may involve performing the analysis with little or no human intervention and/or without ever storing network traffic in non-volatile storage. These privacy restrictions are not unique to our environment, and it means that we (like many others) are left with no option but to process the fire hose of network data judiciously and expeditiously. Thankfully, we are able to leverage a few minutes of recently seen network traffic stored in an in-memory cache. In designing, deploying and evaluating this framework, we overcame several obstacles and make the following contributions that we believe will be of value to the greater networking and security community:
  A method for semantically caching web objects in HTTP network traffic based on URLs requested.
  A scalable trigger mechanism that identifies and filters potentially malicious Flash files requiring further dynamic analysis.
  A novel chaining algorithm that traces web object requests back to their origin.
  A network oracle that identifies client system configurations based on observed network traffic.
  A novel method of "replaying" web sessions by impersonating an observed exploit kit web server.
  An improved honeyclient system based in part on the identification of code injection and code reuse payloads used in an exploit.

II. RELATED WORK

Over the past decade, the web has become a dominant communication channel, and its popularity has fueled the rise of web-based infections. Provos et al. [23] examined the ways in which different web page components are used to exploit web browsers and infect clients through drive-by downloads. That study was later extended [24] to include an understanding of large-scale infrastructures of malware delivery networks and showed that ad syndication significantly contributed to the distribution of drive-by downloads. Grier et al. [9] studied the emergence of the exploit-as-a-service model for drive-by browser compromise and found that many of the most prominent families of malware are propagated from a handful of exploit kit flavors. Thomas et al. [32] provide a more thorough analysis of prevalence of ad injection and highlight several techniques being deployed by ad injectors.

By far the most popular approach to detecting malicious websites involves crawling the web for malicious content starting from a set of known malicious websites [10, 14, 15, 7, 32]. The crawled websites are verified using statistical analysis techniques [14] or by deploying honeyclients in VMs to monitor environment changes [24]. Other approaches include the use of a PageRank algorithm to rank the "maliciousness" of crawled sites [15] and the use of mutual information to detect similarities among content-based features derived from malicious websites [35]. Eshete and Venkatakrishnan [7] identified content and structural features using samples of 38 exploit kits to build a set of classifiers that analyze URLs by visiting them through a honeyclient. These approaches require massive cloud infrastructure to comb the Internet at scale, and are susceptible to cloaking and versioning issues [34].

Gassen and Chapman [8] examine Java JARs directly by running applets in a virtualized environment using an instrumented Java virtual machine looking for specific API calls and behaviors such as file system accesses. Since the approach analyzes JAR files in isolation, it is unable to detect malfeasance when parameters are passed into the applet. Other approaches involve analyzing the source code of exploit kits to understand their behavior. For example, De Maio et al. [6] studied 50 kits to understand the conditions which triggered redirections to certain exploits. Such information can be leveraged for drive-by download detection. Stock et al. [30] clustered exploit kit samples to build host-based signatures for antivirus engines and web browsers.

More germane to our own work are approaches that try to detect malicious websites using HTTP traffic. For example, Cova et al. [5] designed a system to instrument JavaScript runtime environments to detect malicious code execution, while Rieck et al. [25] described an online approach that extracts all code snippets from web pages and loads them into a JavaScript sandbox for inspection. Unfortunately, parsing and executing all JavaScript that crosses the boundary of a large network is not scalable without some mechanism for pre-filtering all the noise produced by benign scripts. Further, simply executing JavaScript without interfacing with the surrounding context, such as relevant HTML and other intertwined contents, makes evading such systems trivial. Our approach addresses both of these issues.

Several approaches utilize statistical machine learning techniques to detect malicious pages by training a classifier with malicious samples and analyzing traffic in a network environment [25, 4, 3, 17, 18, 20]. More comprehensive techniques focus on extracting JavaScript elements that are heavily obfuscated or iframes that link to known malicious sites [23, 5]. Cova et al. [5], Stringhini et al. [31], and Mekky et al. [20] note that malicious websites often require a number of redirections, and build a set of features around that fact. Canali et al. [4] describes a static pre-filter based on HTML, JavaScript, URL and host features while Ma et al. [17, 18] use mainly URL characteristics to identify malicious sites. Some of these approaches are used as pre-filter steps to eliminate likely benign websites from further dynamic analysis [24, 23, 4]. Unfortunately, these techniques take broad strokes in terms of specifying suspicious activity. As a result, Provos et al. [24] reported a 10% false negative rate and Canali et al. [4] reported a false positive rate of between 5% and 25%, while Provos et al. [23] only disclose that using obfuscated JavaScript as an indicator leads to a high number of false positives. These works also require large training sets that are not generally available. By contrast, our approach focuses on behavioral aspects of malware to help reduce false positives and false negatives.

Schlumberger et al. [27] extracts features related to code obfuscation and the use of Java API calls known to be vulnerable, and then detects malicious applets using machine learning. Likewise, Van Overveldt et al. [33] instruments an open source Flash player and extracts similar features to detect malicious ActionScript. While these techniques are dynamically adaptable due to their use of machine learning, they still require a priori notions of how malicious code is constructed. For example, Van Overveldt et al. [33] implements features that are meant to determine whether code or data obfuscation has been used, and whether known vulnerable functions have been used. Intuitively, a previously unknown vulnerability, e.g., a zero-day attack, present in an unobfuscated Flash file will not be detected. Additionally, highly obfuscated Flash exploits wherein the obfuscation itself is the only available feature cannot be reliably detected with this approach without false positives (2% in [33]) since obfuscation is commonly used by benign files. In contrast, our approach does not use obfuscation or known vulnerable functions to make a final decision, thus we have a much lower false positive rate, but can also detect zero-day exploits.

Finally, by far the most popular means of network protection are NIDS, such as Bro [21] or Snort [26], that passively monitor networks and apply content-based signatures to packets and sessions in order to detect malfeasance. These signatures are lightweight, but are evaded through the use of obfuscation and morphing techniques commonly utilized by attackers. They also are not effective against zero-day attacks. To help with forensic analysis, Maier et al. [19] extended Bro with time machine, a lightweight data store for packets, so that Bro could retrospectively query packets by their headers to perform further analysis on interesting events. Time machine has similar goals to our caching and replay mechanism; however, they attempt to achieve this goal at the network layer, storing up to N bytes per connection tuple in a packet trace. In contrast, our approach operates at the application layer by storing reconstructed web objects. For HTTP, this application layer approach achieves much greater compression, as a small number of unique web objects are frequently fetched by users (e.g. Facebook, Google).

We argue that our framework provides the best of both worlds between statistical approaches and honeyclients by bringing the honeyclient to the network. As a result, we can identify new exploits on-the-fly and mitigate threats more swiftly than the current state of the art.

III. OUR APPROACH

In short, our goals are to combine on-the-wire monitoring of network with the use of honeyclients in an attempt to address real-world challenges faced on a large network. We conjecture that such a combination could significantly outperforms content-based signature approach in terms of detection rates, and moreover, can be designed and implemented in a scalable manner. Working at scale, however, comes with several pragmatic challenges. For one, honeyclients are notoriously slow in analysis; however, mechanisms described herein can drastically reduce the amount of traffic analyzed, without basing these mechanisms on preconceived notions as to the innocuity of the traffic in question. Other practical concerns involve finding robust ways to decide what contextual environment should be used for analyzing a potentially malicious event triggered by our framework.

FIG. 1 is a diagram illustrating a high level overview of a malicious traffic detection workflow according to an embodiment of the subject matter described herein. As depicted in FIG. 1, HTTP traffic is monitored at the network border or within an HTTP Proxy. In step 1, a collector reassembles TCP sessions into bidirectional HTTP requests and corresponding responses. HTTP objects are extracted and cached in a two-level semantic cache. In step 2, those objects that represent attack vectors (e.g., Flash, portable document format (PDF), Java, JavaScript, Silverlight) trigger additional analysis. In step 3, our chaining algorithm selects the initial URL to be loaded by the honeyclient. Finally, in step 4, the honeyclient transparently queries the two-level cache and monitors various system events to provide detection. In what follows, we discuss the challenges and solutions we provide for each component in our design.

A. Step 1: Semantic Content Caching

The state-of-the-art application of honeyclient analysis generally involves operators providing a seed list of URLs to the honeyclient, which in turn fetches each live URL within the analysis environment. Operating on-the-wire, however, we can not afford this luxury. Moreover, for privacy reasons, we can not simply log URLs observed on the network and use these URLs as the seed list; such URLs may contain end-user information embedded with parameters that instruct remote servers to perform some action such as purchasing items, posting written content, or verifying some event or action. Thus, we are left with no option but to perform in-memory processing of the fire hose of request content that enters the network, without human intervention or saving of information to non-volatile storage. We can, however, rely on a short window of time (e.g., on the order of minutes) where recent browsing activity is retained in caches that can be queried.

In our approach, we opt for caching observed content at the application layer rather than at the network layer as proposed by Maier et al. [19]. As packets cross the network border, we reassemble them first at the TCP-level into matching {request, response} data streams. Duplicate or malformed TCP packets are discarded as specified by the TCP protocol. Then we reassemble these data streams at the HTTP-level, making each request header and associated response content transparent to our framework. As with TCP packets, malformed HTTP content is discarded in accordance with the protocol specification, and content for other application-layer services is filtered and ignored. Web objects (e.g., HTML, JavaScript, Images, Flash, Java, etc.) are then extracted from the reassembled streams. Object types are determined by using a combination of the HTTP Content-Type header, the file extension specified in the URL, and the first 512 bytes of the payload (e.g., the "file magic"). These objects are then placed in a two-level semantic cache to later be (potentially) queried by the chaining and honeyclient phases of the process (step 4).

The key observation we made in designing our application layer, 2-level, semantic cache is that a significant percentage of network traffic is, in fact, identical content served from a few popular web sites (e.g. Google, Facebook, YouTube). Thus, such a cache is capable of compressing data much more efficiently than at the network layer where each packet of data is more likely to be unique with client address information and different patterns of TCP and HTTP chunking. The first level of our cache is for Web objects that are cacheable network wide—e.g., objects that do not change frequently between client web requests. This cache works similar to a web proxy cache and caches objects based on the Expires and Max-Age HTTP response headers. We use a least recently used (LRU) caching data structure to hold these objects until they either expire, or are evicted because the cache is full. There are many objects that are not cacheable network wide because they provide dynamic content such as a personalized landing page on a social networking web site. As a result, these objects are stored in individual client level caches keyed by IP address. This second level is an LRU cache composed of LRU caches, where client IP addresses are evicted after a tunable period of inactivity. The cache holds a tunable maximum of N client IPs by M objects to manage memory consumption. We revisit the effect these parameters have on memory consumption and the achievable throughput of our framework in Section IV.

We later discuss how this cache is utilized for honeyclients in Section III-C, but for now turn our attention to how one can use this information to hone in on potentially malicious network traffic in an overwhelmingly benign sea of traffic flows.

B. Step 2: Filtering and Triggering

The next challenge for the design of such a system involves intelligently determining whether to apply honeyclient analysis to particular observed URL requests. Indeed, honeyclient analysis is typically slow, on the order of minutes. Thus, we take the approach of analyzing URLs that eventually lead up to one of several commonly exploited file formats—PDF, Java, Silverlight, Flash, Microsoft Office, Excel, or PowerPoint. We observed that by using this simplification we can withstand honeyclient analysis on every instance of these file types observed on the network, with the exception of Flash (see Section IV)—for which we see hundreds of flash objects per minute on our network. Hence, an additional filtering mechanism may be used to reduce the overall number of Flash files analyzed. The academic literature offers a few options we considered. For instance, Ma et al. [17] uses URL features to classify requests as malicious, while Cova et al. [5] uses code obfuscation, specific API calls, and number of iframes as features. These features are effective, but fall short when a new zero-day exploit surfaces that is not inline with the predefined feature set. In short, existing approaches for filtering Flash files take a blacklisting approach, that unfortunately, are evaded during the period of time when attackers exploit a new vulnerability without giving those systems other hints of their malicious intent (e.g., such as multiple layers of obfuscation). We return to that discussion later in Section IV.

Instead, we opted for a whitelisting approach inline with our goal of using honeyclients to detect previously unseen, or zero day, attacks. Our approach, which is based on file popularity, does not make the same assumptions about feature sets as in prior work. The key insight is that the vast majority of Flash files seen on a network are from advertising networks that utilize a relatively few number of unique Flash files to display ads. These ads also flow along the network in a bursty pattern as a web page will typically load multiple advertisements.

Given these insights, we make use of two filters. The first filter takes a 16-byte hash of each Flash file and checks a key-value store of known popular Flash hashes. If the hash appears in the data store it is not analyzed. This basic check eliminates the need to analyze ads wherein the Flash files themselves are identical, but they serve different ad content through the use of different parameters supplied to those files. On the other hand, some ads have their content directly built into the Flash file itself. Our approach to handling this second type of ad is more involved. More specifically, we make the simplifying assumption that a small number of libraries are in use and that some subset of that code is used in each Flash file. Given that assumption, we parse Flash files observed on the network and extract individual function byte-code. We hash the byte-code at the function level to create a piecewise or fuzzy hash [13]. Then, for each new Flash file we may trigger an analysis if it has at least one function that is not in our function-level hash store. If an attacker attempts to masquerade their Flash exploit as a benign ad, we still trigger an analysis since new code may be added to exploit a vulnerability.

Using these filters, the average number of Flash files analyzed per minute drops to less than 10 (from over 100 observed per minute). Even so, Flash offers some interesting challenges, and so to focus our presentation, we center on an in-depth analysis of Flash exploits in Section IV. At this point we have a cache of web objects and a desire to perform a honeyclient analysis based on the observation of a potentially malicious Flash file. We now turn our attention to the details of how all the information collected up to this point comes together to "replay" content for honeyclient analysis without ever contacting live exploit kit servers.

C. Step 3: Client and Server Impersonation

Given some recently observed network traffic containing the interaction of a client and server, the immediate goal at this stage in the overall architecture is to provide an environment in which we can observe client system state changes, e.g. to enable honeyclient analysis. The central challenge is to do so without further interaction with either the client or the server. The observant reader would note, however, that one can rarely analyze a web-based exploit file like Flash in isolation. This is due to the fact that the surrounding context of HTML and JavaScript provide requisite input parameters that enable the exploit to successfully operate. To overcome this obstacle, we recreate that context and replicate client and server configuration based on the previously observed information in the interaction between the client and server.

Client Impersonation

On the client-side there are two primary challenges: (1) replicating client system configuration and (2) determining the originating HTTP request that resulted in the chain of requests leading up to exploit file. To tackle the former challenge, our framework implements an independent network oracle that collects browser and plugin information about every client on the network. Collecting client browser information is a popular activity for attackers [1], which we turn into a valuable resource for our own purpose. Due to data collection limitations on our campus network, we are limited to collecting browser information through the User-Agent and X-Flash-Version fields of HTTP requests, which provides browser, OS and Flash versioning information. In corporate enterprise networks, one can use more sophisticated collection techniques using JavaScript [1]. Nevertheless, our empirical results show that even such limited information provides enough detail to assist with the dynamic configuration of honeyclients to allow them to be successfully exploited.

Tackling the latter client-side challenge turned out to be far more involved. One reason is because a client may have multiple web browser tabs open loading multiple web pages, or a single page loading several other web pages that do not lead to the observed exploit file. To resolve the originating web page of an exploit file we introduce a new algorithm, dubbed the chaining algorithm (Algorithm 1), that operates as follows. First, during the two-level caching step of our workflow (see step 1, Section III-A), the URL from each cached object is timestamped and stored in a list keyed by the corresponding client's IP address. URLs that represent HTML documents are added to the list. When a web object (e.g., Flash file) triggers an analysis, the URL list for the corresponding client IP address is traversed, and request URLs that are within a tunable time threshold are sent to the next step.

---

Algorithm 1 The chaining algorithm searches for the root web page that loads the trigger to be analyzed in the honeyclient.

```
1:   URLList ← List of URLs within timing threshold of trigger.
2:   TriggerURL ← URL of target trigger object.
3:   ProxyAddr ← URL of web cache.
4:   ClientConfig ← Client's browser information.
5:   browser ← HeadlessBrowser(ClientConfig, ProxyAddr)
6:   CurrentBestMatch ← ⊥
7:   BestMatchURL ← ⊥
8:   for all ( do Url ← URLList)
9:       ObjectTags ← browser.SearchForObjectTags(Url)
10:      Match ← FindTriggerInTags(TriggerURL, ObjectTags)
11:      if Match == EXACT_MATCH then
12:          CurrentBestMatch ← Match
13:          BestMatchURL ← Url
14:          BREAK
15:      end if
16:      if Match > CurrentBestMatch then
17:          BestMatchURL ← Url
18:          CurrentBestMatch ← Match
19:      end if
20:  end for
21:  if CurrentBestMatch ≠ ⊥ then
22:      SubmitToHoneyClient(ClientConfig, BestMatchURL)
23:  end if
```

---

Next, Algorithm 1 iterates through each request URL in the list, and loads them one-by-one into an instrumented headless browser (lines 8-20) given the client's browser and IP address information. A headless browser is a web browser without any graphical user interface that allows rapid HTML parsing and JavaScript execution without the overhead of an entire virtual environment. The headless browser uses the two-level semantic cache as a proxy to request corresponding web resources. It parses web content and executes any JavaScript searching for object, applet, and embedded HTML tags (line 9) that are used to load Flash, Java, JavaScript, and Silverlight files. These tags are scanned for absolute and relative references to the exploit file URL (line 10). If the exploit file reference is found in these tags, the request URL is selected as the originating request (lines 10-15).

If no URL leads to an exact match, then the best near-match or potentially malicious match is selected as the originator. We determine near matches through domain, or by domain and path. A potentially malicious match is determined through observed JavaScript behavior, including checks for antivirus plugins, accesses to known exploitable APIs, or attempts to load files on the local hard drive (see Section V, for example).

It is prudent to note that there are cases where a single chain of HTML resources can lead to multiple Flash files. Thus, before sending a URL list to the chaining algorithm for analysis, the network monitor waits several seconds to allow other Flash files to be cached. Each Flash file is then sent with its corresponding URL list to the chaining algorithm for analysis. A request URL may be scanned once, and if it is found to lead to multiple Flash files the remaining chains associated with those files are not re-executed. The honeyclient uses the request URL to load all Flash files and analyzes them all at once (line 22).

Server Impersonation

The most significant challenge with respect to impersonating the server-side of the connection is that it is the headless browser and honeyclient—not the original network client—that makes the web requests to the web cache. As a result, we pass the client IP to the web cache along with the URL. This is done by encoding the client IP into the URL of the initial web request before passing it to the honeyclient.

The web cache decodes the URL, extracts the client IP, and maps the address to the honeyclient's IP to handle subsequent related web requests. Next, the web cache uses the URL to check the network-wide cache. If the URL is not present, the client-level cache is checked. If no web object is found, a 400 status code is returned.

Lastly, web objects are cached with their original HTTP headers. However, since objects are reassembled and decompressed in the cache, some header information (e.g., Transfer-Encoding) is deleted or altered (Content-Encoding) before being served to the client.

D. Step 4: Honeyclient-Based Detection

Once a URL is selected for analysis in step 3, the associated client IP is encoded into the URL and the new URL is sent to a honeyclient. In this context, we define a honeyclient as any software posing as a client that interacts with a server with the goal of determining whether that server is malicious. The framework is designed to be modular allowing for any honeyclient that supports interacting with a proxy server. Our experiments in Section IV make use of unmodified versions of Cuckoo Sandbox (http://www-.cuckoosandbox.org) and ShellOS [28, 29]. We chose these two approaches due to the fact that they collect very different metrics and have different runtime requirements. Specifically, ShellOS analyzes a virtualized environment for evidence of injected code (or shellcode) by executing potential instruction sequences from an application memory snapshot directly on the CPU. Thus, ShellOS monitors the programmatic behaviors of a malicious payload. ShellOS labels a sample as malicious if any of the following are true:

- The process memory contains a code injection or code reuse payload.
- The process memory exceeds a tunable threshold (500 MB in our analysis), e.g. a heap spray is likely to have occurred.
- The process terminates or crashes.

By contrast, Cuckoo monitors changes to a virtualized environment primarily by API hooking. API hooking is the process of intercepting function calls, messages, and events in order to understand application behaviors. We use Cuckoo Sandbox to label a sample as malicious if any of the following is true:

- The process uses known anti-detection techniques.
- The process spawns another process.
- The process downloads an executable (exe) file or dynamic-linked library (dll) file.
- The process accesses registry or system files.
- Network traffic contacts non-application related hosts.
- The process accesses potentially sensitive information in the browser process.
- The process modifies system security settings.

In order to separate the honeyclient approaches from their specific implementations, we refer to ShellOS as H1 and Cuckoo as H2 in Section IV. Our evaluation shows that monitoring system state with either of these approaches significantly improves detection performance over content-based signatures.

E. Prototype Implementation

Our prototype implementation consists of 8192 lines of custom C/C++, Java and Golang code. The libnids library provides TCP reassembly. We implemented a Go IO reader interface for libnids to adapt Go's in-built HTTP request and response parsing to captured network traffic. The resulting HTTP objects are stored using a multi-tiered hash map keyed by client IP address and the URL requested, as described in Section III-A. Triggers are implemented with a combination of both response MIME-type and the "file magic" indicating a file type of interest.

The sheer volume of Flash requests observed on our campus network necessitated additional filtering for Flash file triggers, as described in Section III-B. Our Flash parsing and fuzzy hashing is all custom code written in Go, as is the implementation that impersonates the attack server. For our headless browser, we use HTMLUnit, an open source implementation written in Java that incorporates the Rhino JavaScript Engine. HTMLUnit can mimic Internet Explorer, Firefox and Chrome and is controllable programmatically. Furthermore, the browser is extensible allowing for the addition of customized plugins and ActiveX objects to simulate various versions of Java, Flash, and Silverlight. Framework modules communicate with one another using a web-based REST messaging service in addition to Redis, a key-value cache and store.

IV. EVALUATION

To demonstrate the efficacy of our framework we conducted both an offline evaluation with known exploit kit traces and an online analysis on a large campus network. In short, our findings suggest that on-the-wire honeyclients consistently out-perform signature-based systems by discovering exploited clients days and weeks ahead of those systems. We also show that a single on-the-wire honeyclient server is capable of keeping pace with a large campus network at its boundary.

A. On Detection Performance

Experiments in this section are conducted on a Dell Optiplex desktop with 4 core i7-2600 CPU at 3.40 GHz and 16 GB RAM. Two different honeyclients are used for each sample—H1 and H2—as described in the previous section, with their default installations using Qemu and Virtual Box virtual machines, respectively, on Ubuntu Linux 14.04 64-bit. The analysis time for H1 is set to 30 seconds, while H2's timeout is 5 minutes. Each honeyclient uses the same VM configuration—Windows 7 32-bit, either Internet Explorer (IE) 8 or IE 10, and one of 8 different versions of Adobe Flash Player configured dynamically based on information retrieved from the network oracle (see section Section III-C). Honeyclient results are then contrasted to the results of 50 antivirus engines (using analysis available at http://www.virustotal.com).

We inspected 177 HTTP publicly available packet trace samples of exploit kits (e.g., samples available at http://www.malware-traffic-analysis.net). Each trace represents a packet recording of all HTTP traffic between a Windows 7 virtual machine and a real-world website known to be injected with an exploit kit landing page, typically through an injected iframe. Over a year of traces were collected between April 2014 and June 2015 representing successful exploits from 10 unique exploit kit flavors that evolved over this one year period. Thus, our dataset is representative of the diversity of real-world attacks that would be encountered if our framework were to be deployed on any large network.

| Exploit Kit | Uses Payload | Crashes | Heapsprays | Terminates | Misses | Total Detections | Total Instances |
|---|---|---|---|---|---|---|---|
| Nuclear | 24 | 0 | 1 | 1 | 3 | 25 | 28 |
| Angler | 32 | 1 | 0 | 0 | 0 | 33 | 33 |
| Magnitude | 4 | 2 | 1 | 0 | 1 | 6 | 7 |
| Sweet Orange | 21 | 0 | 0 | 0 | 0 | 21 | 21 |
| RIG | 16 | 8 | 0 | 2 | 0 | 18 | 18 |
| Neutrino | 9 | 1 | 2 | 0 | 0 | 9 | 9 |
| Fiesta | 28 | 1 | 0 | 0 | 9 | 29 | 38 |
| Null Hole | 1 | 1 | 0 | 0 | 0 | 1 | 1 |
| Flashpack | 7 | 8 | 1 | 1 | 1 | 12 | 13 |
| Infinity | 5 | 0 | 0 | 4 | 0 | 9 | 9 |
|  | 147 | 22 | 5 | 8 | 14 | 163 | 177 |

On-the-Wire Performance of Honeyclient H1

Table I shows the evaluation results for our framework using H1 with a breakdown of how each exploit kit is detected. In all cases, the exploit file and originating request URL are identified (step 2) and forwarded to the honeyclient for inspection (step 4). Overall, this configuration has a 92% true positive rate. The vast majority of detections are from code injection payloads in process memory, suggesting that the use of code injection payloads is still a prominent means of exploitation, despite a multitude of commonly deployed endpoint defenses. The missed detections result from exploits that do not make use of traditional code injection. Rather, they use a memory disclosure vulnerability to leak system API addresses and then dynamically construct the injected code using this information. As a result, the so-called PEB heuristic [22] used by H1, which identifies the API address lookups of injected code, is never triggered. H2, on the other hand, uses a disjoint set of features such as monitoring file drops, process launches, and registry and file accesses through function-level hooking.

detect the 14 exploit kits that H1 misses by observing accesses to the filesystem, process launches and file downloads.

The results of our evaluation indicate that injected code detection is a robust feature for determining maliciousness. It is used by 83% of exploits, and does not require successful exploitation for detection. For example, exploits using injected code to detect virtualization are detected by H1 even if they decide not to compromise the system. However, H1 may not handle virtualization checks that are done through JavaScript based filesystem checks (Section V) prior to constructing or unpacking the injected code. Indeed, Angler would have been undetectable by H1 had it checked for files related to QEMU prior to unpacking the code injection payload. As a result, H2's file and registry access hooks, as well as environmental change detection, are equally important. Using all features from both honeyclients enables the framework to achieve a 100% true positive rate. Even so, it may be possible for attacks to evade these

| Exploit Kit | Process Launch | File Drop | Browser Crash | File Access | Misses | Total Detections | Total Instances |
|---|---|---|---|---|---|---|---|
| Nuclear | 3 | 1 | 5 | 5 | 14 | 14 | 28 |
| Angler | 0 | 0 | 4 | 20 | 9 | 24 | 33 |
| Magnitude | 2 | 0 | 0 | 0 | 5 | 2 | 7 |
| Sweet Orange | 2 | 0 | 0 | 1 | 18 | 3 | 21 |
| RIG | 3 | 0 | 7 | 0 | 8 | 10 | 18 |
| Neutrino | 2 | 0 | 0 | 0 | 7 | 2 | 9 |
| Fiesta | 26 | 26 | 0 | 0 | 12 | 26 | 38 |
| Null Hole | 0 | 0 | 1 | 0 | 0 | 1 | 1 |
| Flashpack | 5 | 0 | 5 | 0 | 3 | 10 | 13 |
| Infinity | 2 | 1 | 5 | 0 | 1 | 8 | 9 |
|  | 45 | 28 | 27 | 26 | 77 | 100 | 177 |

On-the-Wire Performance of H2

The results when using H2 with our framework are shown in Table II. This configuration resulted in a 56% true positive rate. One reason for this lower detection rate is that browser-based analysis is a relatively new feature in H2 and IE 10 is not fully supported at this time. Digging deeper into the remaining missed detections, we found that the exploits are unhooking four Windows API calls (details in Section V) that are used by attackers to determine whether they are operating in a virtualized environment. In short, the exploits use injected code to first remove H2's hooks, and then call those APIs to determine if the system is virtualized. Attacks immediately cease when a virtualized environment is detected in these samples. Nevertheless, H2's heuristics are still useful for exploit detection. For example, H2 is able to honeyclients by combining unique methods of unhooking functions with injected code that does not perform API lookups.

We reiterate that the design and implementation of specific honeyclient technologies is an ongoing research topic, but the primary goal of our work is to provide a framework that effectively leverages such advancements on-the-wire. To that end, these experiments confirm the efficacy of our approach by providing honeyclients H1 and H2 with all relevant information needed to replay and reproduce the attacks. Indeed, our framework achieves a 100% success rate in this context. Content-based Signature Comparison: Next, we compare the performance of honeyclients using our framework with that of content-based signatures, e.g. antivirus engines. We checked each exploit file associated with all 177 HTTP traces against 50 signature engines and found that on average 50% of these engines labeled the exploit file as malicious (note that some of these engines also incorporate a heuristic approach in their determination). One could argue that perhaps some of these engines perform better than others and, indeed, three of the engines detect all of the given exploit files, e.g., 100% true positive rate. However, we argue that such a comparison against a honeyclient is biased and incorrect in practice—The honeyclients operate with only the general knowledge accumulated over many years, while content-based signature engines update their knowledge base per each newly observed malicious file. Indeed, there is little value in system that does not detect a malicious file at the time it is used to attack one's network. We hypothesize that signature engine performance is significantly worse than our on-the-wire honeyclient when comparing it to a signature engine using only those signatures available at the time of the attack.

Figure 2A:
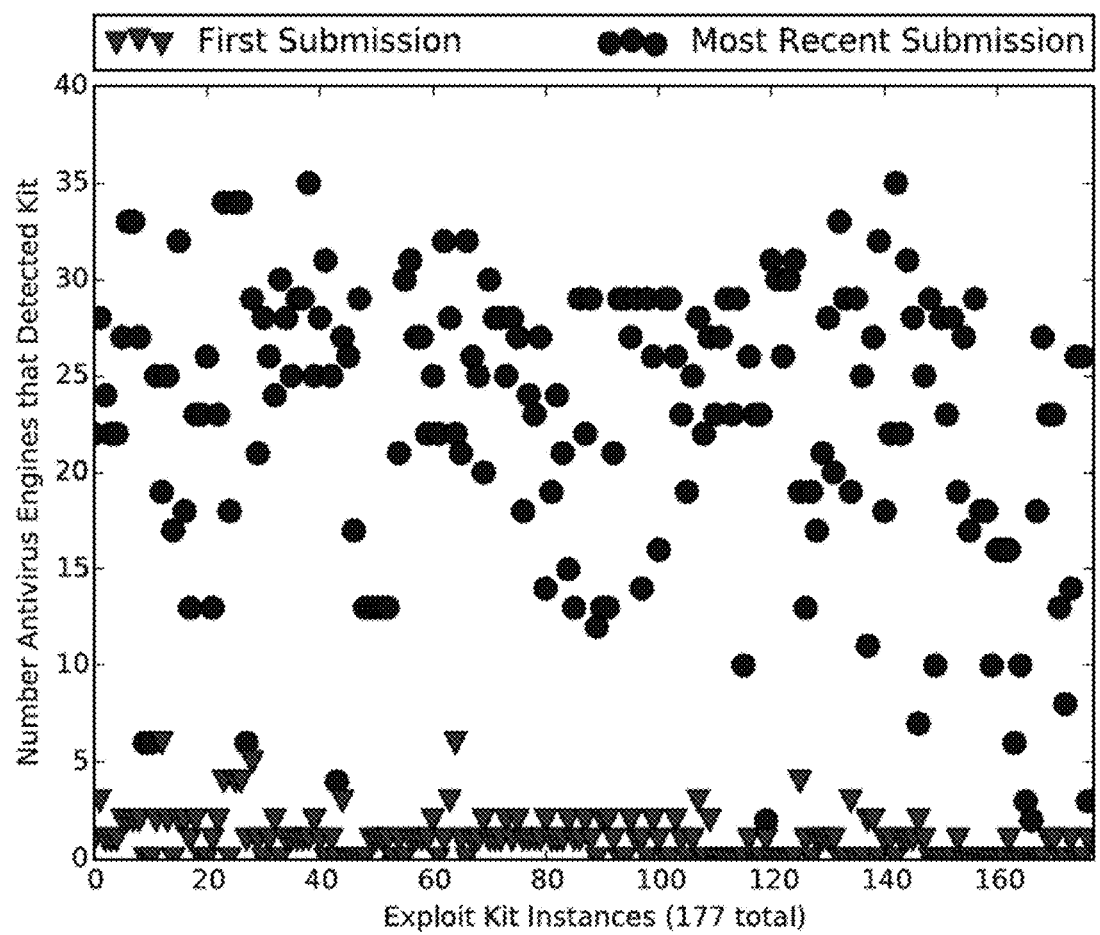
FIG. 2A is a diagram illustrating detections of exploit kit instances by a number of antivirus engines.
Figure 2B:
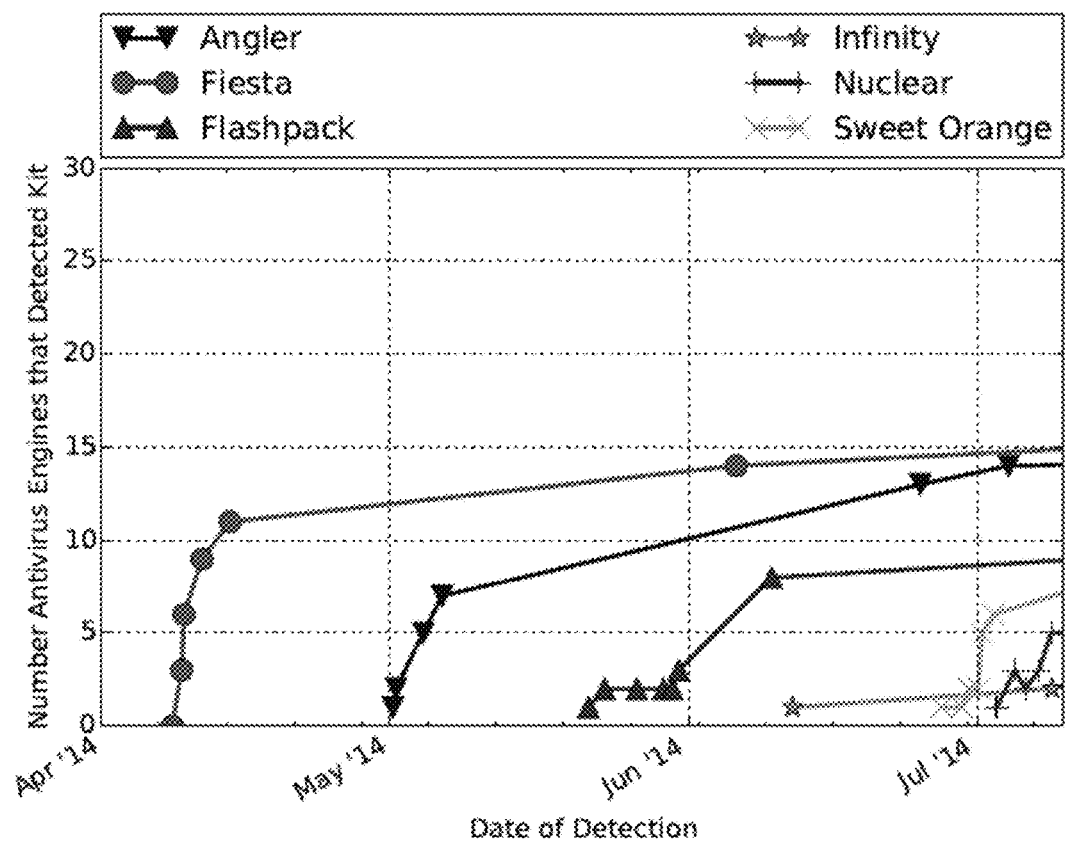
FIG. 2B is a diagram illustrating detection rates of six Flash exploit instances over time for a number of antivirus engines.

Indeed, our experiments confirm the aforementioned hypothesis. The results of this analysis are depicted in FIGS. 2A and 2B. FIG. 2A is a diagram illustrating detections of exploit kit instances by a number of antivirus engines. FIG. 2A shows that at initial attack time, 69 of the exploits go completely undetected by all engines. In other words, the best engine has no more than a 61% true positive rate. Another 70 are only detected by a single engine, meaning that 98% of engines have no better than a 21% true positive rate. More unsettling is that two different instances of the same exploit kit found a year apart still leads to at most 3 signature-engine detections. Thus, finding a single instance of an exploit file does not appear useful for these engines in finding newer exploit files from the same exploit kit, unless the files are exactly the same.

Another concerning revelation is how long it takes for signature-based engines to detect exploits after initial observation. FIG. 2B is a diagram illustrating detection rates of six Flash exploit instances over time for a number of antivirus engines. As depicted in FIG. 2B, we randomly selected six exploit kit instances from the sample set and analyzed how many engines detected the instance over time starting from the initial observation to the last. In the case of Angler, Flashpack, Nuclear and Sweet Orange, 3 to 10 days passed before 5 engines are able to detect the exploit. For Infinity, a month elapsed before signatures were distributed for each exploit instance. Unfortunately, with the rapidly moving and morphing nature of these kits, the instances are no longer active on the Internet by the time content-based signature engines have rules to detect them. By contrast, honeyclients have no preconceived notions about what is malicious, but rather execute new files in a dynamic environment and monitors system state change and the factors described in Section III-D. As a result, our framework detects attacks on-the-wire when it matters, e.g., as they happen.

In summary, the use of H1 and H2 with our framework detects 100% of attacks in our diverse sample set, while the combination of 50 signature-based engines achieves 61% detection. Next, we present the results of live-testing on-the-wire and report on false positives.

| Metasploit Exploit | CVE Numbers | Flash Version Used |
|---|---|---|
| adobe_Flash_pixel_bender_bof | CVE-2014-0515 | 11.5.502.136 |
| adobe_Flash_avm2 | CVE-2014-0497 | 11.5.502.136 |
| adobe_Flash_regex_value | CVE-2013-0634 | 11.5.502.136 |
| adobe_Flash_uncompress_zlib_uaf | CVE-2015-0311 | 16.0.0.235 |
| adobe_Flash_net_connection_confusion | CVE-2015-0336 | 16.0.0.235 |
| adobe_Flash_worker_byte_array_uaf | CVE-2015-0313 | 16.0.0.235 |
| adobe_Flash_pore | CVE-2015-0318 | 16.0.0.235 |
| adobe_Flash_nellymoser_bof | CVE-2015-3043, CVE-2015-3113 | 17.0.0.134 |
| adobe_Flash_shader_job_overflow | CVE-2015-3090 | 17.0.0.134 |
| adobe_Flash_shader_drawing_fill | CVE-2015-03105 | 17.0.0.134 |
| adobe_Flash_domain_memory_uaf | CVE-2015-0359 | 17.0.0.134 |

B. On Live Traffic Analysis

We now turn our attention to detection in the face of significant background traffic. That is, experiments in this section demonstrate that our framework can successfully detect exploits from the larger haystack of benign traffic while maintaining a negligible false positive rate. To that end, we ran our framework on a campus network for a 24 hour period in August 2015. The University has over 25 thousand (k) students, faculty and staff with an average network throughput of 1 Gbps (in the summer) and 7 Gbps (during the school year) on a 10 Gbps link. Our tap utilizes an EndaceDAG data capture card on a Dell R410 rack-mounted server with 32 GB RAM and an 8-core Xeon 2100 CPU. Furthermore, we used the H1 honeyclient running with five VM, allowing us to run five concurrent analyzes.

But before we can run our online test, we establish the Flash filters. To do so, we investigated the Flash file download patterns of the university network by monitoring the network for a three day period in July. We collected Flash file hashes, piecewise hashes (described in section III-B), and requested URLs.

Over the course of the experiment, the network starts to reach a steady state where fewer and fewer new Flash instances are observed. In 98% of the minutes analyzed, we see four or fewer new files, while in 57% of the minutes we see no new files at all. We use the file hashes, and piecewise hashes collected over the three day period in July as the filters for our live traffic analysis conducted in August.

During our 24 hour test in August and monitoring both Firefox and Internet Explorer network traffic, we observed 23,387 unique IP addresses with up to 1,000 concurrent users. Throughput ranged from 7 k-18 k HTTP flows per minute during this period. Our implementation reassembled TCP streams, parsed HTTP flows, and cached all web objects (step 1) without dropping a single packet.

At the same time, we hosted a malicious landing page on an external network. (Specifically, we used Metasploit's browser pwn2 module on an Amazon EC2 instance.) The exploit server automatically detects the victim's software configuration before serving one or more appropriate Flash exploits. In total, 11 unique Flash exploits are hosted (see Table III). Our "victim" system runs IE10 and Firefox on a Windows 7 VM within our campus network. We instrumented the victim to repeatedly visit the landing page with different versions of Flash installed, triggering each of the different exploits.

Since no packets are dropped in step 1, it is not surprising that our framework detected all of these exploit instances in face of all the noise produced by the benign traffic. At the same time, no false positives were generated by our framework over the course of this 24 hour period.

We note, however, that our framework only incorporates honeyclient H1 in this experiment due to the sheer volume of Flash files observed. Indeed, due to students returning to campus, the framework had to analyze on average 6.8 flash files per minute (after filtering), with peak rates of 12 flash files per minute.

V. CASE STUDY

In what follows, we perform a more in-depth analysis of the inner workings of the exploit kits in our empirical evaluation. Interesting, although we originally surmised that the landing pages would likely look like advertisements, we quickly noticed that the majority of pages were either composed of randomized English words or encoded character sets (or both). Indeed, these pages are never meant to be seen by the user, but rather hidden in a small iframe. Furthermore, buried in these pages are nuggets of data that the kit uses to help ensure it is not being run in isolation. For example, embedded JavaScript might only fully execute if the color of the third paragraph on the landing page is "red".

JavaScript is often the language of choice for would be attackers as it can be used to check browser configurations, and administer exploits either through browser or plugin vulnerabilities. The language is also ideal for obfuscation because objects and their functions are represented as hash tables making obfuscated code almost impossible to decipher (FIG. 3) without a debugger. FIG. 3 is a JavaScript snippet depicting obfuscation of a document.write( ) call. Note that the 'write' string would typically be built from a method which decodes a long string making it impossible to decipher without running the code.

As mentioned above, almost all exploit kits conduct a reconnaissance phase to collect information about the browser and to determine whether it is operating in a legitimate environment. Browser configurations are determined using either the navigator.plugins API (Chrome, Firefox, and IE (11+)), or the proprietary ActiveXObject in older versions of IE. A kit will use browser vulnerabilities to determine whether it is operating in a virtualized environment, and will drop one or more exploit payloads onto the client system if the coast is clear. Below we describe some of the key characteristics of popular exploit kit families.

The Fiesta landing page is known for checking for a number of vulnerabilities in the browser and serving multiple exploits at once. The kit communicates with its server by encoding browser plugin information directly into the URL that is sent to exploit server similar to a command-and-control channel for a botnet. Fiesta's attack of choice is to abuse weaponized PDF documents to drop one or more malicious binaries onto the system. Indeed, we found one instance of the kit that dropped 12 binaries onto the system, while other instances launched ping, or a command shell.

SweetOrange likes to use JavaScript heapspray attacks, particularly by exploiting the rarely used VML API in Internet Explorer to infect its victims. (Additional details are in the whitepaper at http://www.vupen.com/blog/20130522.) In three cases, the exploit kit launched the Windows Control Panel (control.exe) presumably to turn off key services.

Angler and Nuclear appear to be popular vectors for dropping so-called Ransomware. Recent versions (circa June 2015) of the kits are known to check for Kaspersky and Norton browser plugins and to use vulnerabilities in the IE browser to detect virtualization. For example, the Angler Exploit Kit can use an HTML script with an invalid language to check for commonly installed files related to VMWare, VirtualBox, Parallels, Kaspersky, and Fiddler. If any of the aforementioned applications exist, the Angler Exploit Kit will not exploit the system. Instances of Angler from April of 2015 do similar checking using JavaScript's Image object as a medium to gain disk access.

These exploit kits also like to embed JavaScript directly into the HTML of the landing page. Indeed, entire JavaScript libraries are embedded inside HTML tags such as a paragraph <p> tag. The JavaScript is decoded by a number of obfuscated method calls, and the resulting code is executed using an eval function call. As a result, current generation exploits are analyzed within the larger context of the website.

A. On Campus Findings

During the course of the online test, 6,725 files were left after the first round of filtering and passed on for further analysis. Half of these files were from Chrome browsers, which we currently do not support, and were not further analyzed in the online test. The majority of remaining flash files analyzed were from either advertising, movie or adult sites, with a few smaller vendor websites related to cars, books and other items. 157 of these were sent on to the detection engine, H1, for final inspection, and all but one was flagged as benign.

The flagged malicious event barred striking resemblance to the Magnitude samples examined in Section IV. In this case, the file emanated from a short-lived Indian domain that injected a flash file into an IE browser on the VM. Similar to the Magnitude instances previously examined, the operating system crashed.

VI. LIMITATIONS

Many of the evasion techniques used against our system are inherent to honeyclients in general and are being actively researched in the security community. For example, as shown in our use case, exploits will often check for evidence that the environment is a virtual machine. In the short term, we can help combat this check by installing VM libraries in nonstandard locations or attempting to detect and flag potentially evasive behavior. In the long term, however, a better solution would be to adopt ideas from Kirat et al. [11, 12] to build sandboxes on "bare-metal" that are be able to revert system changes without relying on hardware virtualization.

An obvious attack against sandbox-based approaches is for the attacker to inject delays into the exploit kit code in the hopes that the sandbox execution will timeout before the exploit is executed. Such timeouts can be risky for the attacker because the user of the targeted machine could surf to a new page before the delay has transpired. One way to combat such delays is by instrumenting our headless browser to record sleep times and ensuring that the sandbox runs for at least that time period. Sandboxes in general can also attempt to patch out sleep functionality or adjust the time value it presents to the software, but either of these techniques can still be defeated if malware uses external sources of time information, such as the internet, to verify that the embedded delays have completed as expected. (See "Sleeping Your Way Out Of The Sandbox", SANS Institute Reading Room, accessed Aug. 16, 2015.) Thwarting such attacks remains an active area of research and this limitation is not specific to our approach [16]. Attackers can also force a user to interact with the system in some way before triggering an exploit. Such an attack would be difficult to detect in a framework such as ours, which is designed to work without manual intervention. Extensions to the framework could simulate user interaction, such as automated button clicks. Also, if an attacker is willing to require user interaction in order to carry out an attack, many other non-exploit attack vectors exist, such as simply tricking a user into downloading and running an executable file.

Alternatively, an exploit could also alter URLs using some randomized token based on local settings. One approach to thwarting such attacks is to perform URL similarity matching (as done extensively in the literature [31]) while instrumenting the headless browser to pass file types to the web cache in order to improve the matching process. Lastly, an attacker could try to overwhelm the framework by loading several Flash files at once with only one of the files being malicious. Our chaining algorithm tries to mitigate this attack by analyzing URLs that lead to multiple exploitable files only once. This is by no means foolproof, but large spikes in Flash files could also be recorded and presented to the security analyst for further analysis.

VII. CONCLUSION

In accordance with various aspects of the subject matter described herein, a network-centric approach is presented to accurately and scalably detect malicious exploit kit traffic by bringing a honeyclient to-the-wire. By caching, filtering and replaying traffic associated with exploitable files, our approach allows us to use our knowledge of the clients in the network to dynamically run exploits in a safe and controlled environment. We evaluated our framework on network traces associated with 177 real-world exploit kits and demonstrated that we could detect zero-day exploits as they occur on the wire, weeks before conventional approaches. We supplement these analyses with case studies discussing interesting aspects of the detected behaviors in the studied exploit kits. Lastly, a preliminary analysis in an operational deployment on a large university campus network shows that our techniques can handle massive HTTP traffic volumes with modest hardware.

Figure 4:
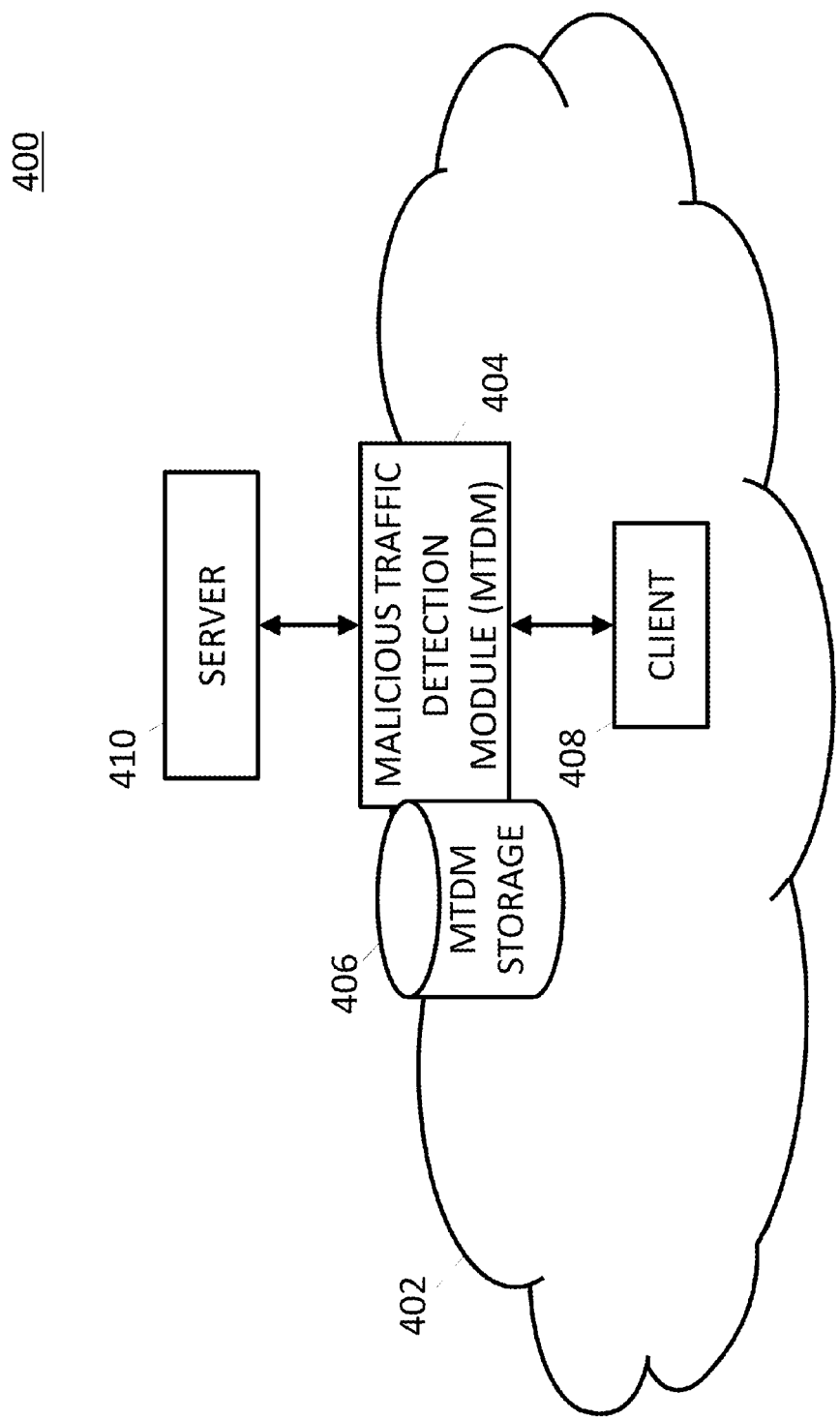
FIG. 4 is a diagram illustrating a computing environment for detecting malicious network traffic according to an embodiment of the subject matter described herein.

FIG. 4 is a diagram illustrating a computing environment 400 for detecting malicious network traffic according to an embodiment of the subject matter described herein. Referring to FIG. 4, a computing environment 400 may include a network 402 and a server 410. Server 410 may represent any suitable entity or entities, such as a computing device, a processor, a virtual machine, or multiple computing platforms, for providing web content and/or network traffic. For example, server 410 may be a computing platform or web server configured to send malicious network traffic containing URLs for accessing malicious files. In this example, server 410 may utilize one or more exploit kits or related software for infecting one or more client computers. It will be understood that server 410 is illustrative and that multiple servers (e.g., hosts on the Internet) may interact with network 402. Further, it will be understood that traffic from or to any server may be monitored by a malicious traffic detection module (MTDM) 404 for detecting malicious network traffic or related files.

Network 402 may represent one or more communications networks, such as the Internet, an intranet, a local area network (LAN), and/or a wide area network (WAN). For example, network 402 may represent a college campus network and server 410 may represent a web server located in another network, e.g., the Internet.

Network 402 may include a client 408. Client 408 may represent any entity (e.g., a computing platform, a mobile phone, or a tablet computer) for communicating with server 410. For example, client 408 may send one or more HTTP request messages to server 410. In this example, the HTTP messages may be sent in one or more data packets, such as IP packets. It will be understood that client 408 is for illustrative purposes and that multiple clients may be in network 402. Further, it will be understood that traffic from or to any client may be monitored by MTDM 404 for detecting malicious network traffic or related files.

Network 402 may include MTDM 404 and an MTDM storage 406. MTDM 404 may be any suitable entity or entities (e.g., software executing on a processor, a field-programmable gateway array (FPGA), an application-specific integrated circuit (ASIC), or a combination of software, an ASIC, or an FPGA) for performing one or more aspects associated with malicious traffic detection.

In some embodiments, MTDM 404 may include various mechanisms, techniques, and/or functionalities described above, e.g., with regard to the description of FIG. 1. For example, MTDM 404 may include functionality for performing semantic content caching of network traffic, functionality for performing filtering and trigger for identifying network traffic for further analysis or inspection, functionality for performing client and server impersonation (e.g., emulation) for replaying network traffic, and/or functionality for malicious traffic detection (e.g., at a honeyclient or emulated client).

In some embodiments, MTDM 404 may include or utilize a network tap or related device, such as an EndaceDAG data capture card, to observe and collect network traffic information associated with network 402. For example, MTDM 404 may use a network tap for observing and copying network traffic between client 408 and server 410. In this example, the network tap may send the copied network traffic to another entity which may analyze and/or process the network traffic into streams of HTTP request and response sets. The processed network traffic may be stored in various data structures, such as hash maps and/or associative arrays.

In some embodiments, MTDM 404 may include functionality for caching network traffic or related content at an application level. For example, MTDM 404 may reassemble observed packets at the TCP-level into matching {request, response} data streams. In this example, these data streams may be reassembled at the HTTP-level. Continuing with this example, web objects (e.g., HTML, Images, Flash, Java, JavaScript, etc.) may be extracted from the reassembled streams and stored in a two-level (e.g., global-level and client-level) semantic cache.

In some embodiments, MTDM 404 may determine object types by using a combination of the HTTP Content-Type header, the file extension specified in the URL, and the first 512 bytes of the payload (e.g., the "file magic").

In some embodiments, MTDM 404 may include functionality for winnowing network traffic and/or related content for malicious traffic detection analysis. For example, MTDM 404 may determine that malicious traffic detection analysis may be performed for suspicious files or file types. In this example, MTDM 404 may determine that URLs that yield or that are associated with a commonly exploited file format (e.g., PDF, Java, JavaScript, Silverlight, Flash, Microsoft Office, Excel, or PowerPoint) should be analyzed for malicious behaviors.

In some embodiments, MTDM 404 may include functionality for further winnowing certain files or file types for malicious traffic detection analysis. For example, assuming MTDM 404 observes a significant number of Flash files, MTDM 404 may use two filters to determine whether malicious traffic detection analysis should be performed for a given Flash file. In this example, the first filter may use a hash value based on the Flash file as a key for checking a key-value store (e.g., a whitelist) of benign (e.g., known popular) Flash hash values. If the hash value does not appear in the data store, the associated Flash file may be analyzed for malicious behaviors. Continuing with this example, MTDM 404 may also use a second filter for analyzing portions of the Flash file. For instance, MTDM 404 may parse the Flash file into a number of functions and may check to see if each portion is in a key-value store representing benign Flash functions. If at least one function is not in the key-value store, the associated Flash file may be analyzed for malicious behaviors.

In some embodiments, MTDM 404 may include functionality for emulating a client system. For example, MTDM 404 and/or a related entity (e.g., a network oracle) may collect or obtain browser and/or plugin information, e.g., information about a browser version, a Flash version, and/or an OS version, related to client 408. In this example, MTDM 404 may use this information to configure an emulated client to be similar to client 408. Continuing with this example, the emulated client may use a headless browser (e.g., a web browser application with no graphical user interface) to interact with an emulated server.

In some embodiments, MTDM 404 may include functionality for emulating a server system. For example, MTDM 404 may implement an emulated server that responds to requests from an emulated client and provide responses based on observed (e.g., cached) responses from server 410. In this example, MTDM 404 may use cached network traffic, client-related information, and server-related information to make interactions using the emulated client and the emulated server mimic observed interactions between client 408 and server 410.

In some embodiments, MTDM 404 may include functionality for identify an originating HTTP request message or other event that yields a suspicious URL and/or a related payload or file. For example, MTDM 404 may use a chaining algorithm as described above or a variant thereof for identifying an HTTP request message that eventually yields a URL. In this example, MTDM 404 may use a headless browser to request and parse web content and execute any JavaScript searching for object, applet, and embedded HTML tags that are used to load Flash, Java, Silverlight, JavaScript, and/or other potentially malicious files. Continuing with this example, MTDM 404 may scan these tags for absolute and relative references to a suspicious file or a corresponding URL.

In some embodiments, MTDM 404 may include functionality for analyzing a URL and/or a related payload or file so as to detect malicious behaviors. For example, MTDM 404 may implement a honeyclient (e.g., an emulated client) that utilizes various mechanisms and/or techniques for detecting malicious behaviors in a safe and/or controlled environment. In this example, the honeyclient can use techniques to detect a malicious behavior (e.g., a code injection attack, a heap spray attack, etc.) associated with executing or using a URL and/or a related payload or file.

MTDM storage 406 may represent any suitable entity (e.g., random access memory (RAM), physical disks, magnetic tape, or flash memory) for storing any information associated with malicious traffic detection, such as network traffic, client related information, server related information, malicious behavior information, known benign file information, configuration information for VMs and/or emulated nodes, user preferences, and/or other information. Various entities, such as MTDM 404 or other entities, may access (e.g., read from and/or write to) MTDM storage 406. In some embodiments, MTDM storage 406 may be located at MTDM 404, another node, or distributed across multiple computing platforms or devices in computing environment 400. For example, MTDM storage 406 may represent a distributed database system capable of caching network traffic and/or other information across multiple storage devices.

It will be appreciated that FIG. 4 is for illustrative purposes and that various nodes, their locations, and/or their functions may be changed, altered, added, or removed. For example, some nodes and/or functions may be combined into a single entity or some functionality (e.g., in MTDM 404) may be separated into separate nodes or modules.

FIG. 5 is a diagram illustrating a process 500 for detecting malicious network traffic according to an embodiment of the subject matter described herein. In some embodiments, process 500, or portions thereof (e.g., steps 502, 504, and/or 506) may be performed by or at MTDM 404 and/or another node or module. For example, MTDM 404 may include or communicate with a network tap for caching network traffic between client 408 and server 410. In this example, MTDM may also include or communicate with a server executing one or more VMs for replaying network traffic using an emulated client and an emulated server.

Referring to process 500, in step 502, network traffic between client 408 and server 410 may be cached. The network traffic may include a URL for accessing at least one file from server 410. For example, server 410 may send a URL for downloading a malicious Flash file that exploits a vulnerability associated with client 408.

In some embodiments, network traffic may include HTTP requests and HTTP responses based on data from observed packets communicated between client 408 and server 410.

In step 504, it may be determined whether the at least one file is suspicious. In some embodiments, determining that at least one file is suspicious may include determining that the at least one file includes a PDF file, a Java file, a Silverlight file, a Microsoft Office file, a Microsoft Word file, a Flash file (e.g., an Adobe Flash or Shockwave file), an Microsoft Excel file, or a Microsoft PowerPoint file.

In some embodiments, determining whether at least one file is suspicious may include determining that a Flash file or at least one function within the Flash file is not known to be benign. For example, MTDM 404 may determine that at least one file includes a Flash file and may also determine that the Flash file is inconclusive with regard to a benign file determination analysis (e.g., the analysis may conclude with a determination that the Flash file is not found in a data store representing known and/or benign Flash files) or that at least one function within the Flash file is inconclusive with regard to a benign function determination analysis (e.g., the analysis may conclude with a determination that a Flash file portion, such as a function, is not found in a data store representing known and/or benign Flash file portions).

In step 506, in response to determining that the at least one file is suspicious, it may be determined whether the at least one file is malicious by replaying the network traffic between an emulated client and an emulated server.

In some embodiments, replaying network traffic using an emulated client and an emulated server may include configuring the emulated client (e.g., to be similar to client 408) using client browser information from cached network traffic and determining, from the network traffic, an originating request that triggers one or more events that yield a suspicious URL.

In some embodiments, replaying network traffic may include receiving, by an emulated client, a response from an emulated server, wherein the response is based on a cached response from server 410, and monitoring, by the emulated client, effects of the response for identifying at least one malicious behavior.

In some embodiments, monitoring effects of a response may include using a virtualized environment or application programming interface (API) hooks. For example, MTDM 404 may use various mechanisms and/or techniques for detecting malicious traffic, including using application memory snapshots and/or API hook monitoring.

In some embodiments, effects of a response may include programmatic behaviors of a payload of the response or changes to an emulated client's computing environment caused by the response. Some examples of malicious behavior associated with a response may include a process memory associated with the response contains a code injection or code reuse payload, a process memory associated with the response exceeds a tunable threshold, a process associated with the response terminates or crashes, a process associated with the response uses a known anti-detection technique, a process associated with the response spawns another process, a process associated with the response downloads an executable file or a dll file, a process associated with the response accesses a system registry or a system file, a process associated with the response communicates with a non-application related host, a process associated with the response accesses potentially sensitive information, and/or a process associated with the response modifies system security settings.

It should be noted that MTDM 404 and/or functionality described herein may constitute a special purpose computing device (e.g., network intrusion detection system or an on-the-wire honeyclient analysis system). Further, MTDM 404 and/or functionality described herein can improve the technological field of network security and/or computer security by providing mechanisms for detecting malicious network traffic (e.g., traffic related to exploit kits) by caching and replaying traffic associated with exploitable files (e.g., Flash files, PDF files, Microsoft Office Files, etc.) in a safe and controlled environment (e.g., a VM). As such, various techniques and/or mechanisms described herein can detect and/or prevent malicious activity (e.g., exploit attacks) at or near real-time, while conventional detection systems can require days, weeks, or even months to analyze and detect such activity.

The disclosure of each of the following references is incorporated herein by reference in its entirety.

REFERENCES

[1] G. Acar, M. Juarez, N. Nikiforakis, C. Diaz, S. Gürses, F. Piessens, and B. Preneel, "FPDetective: Dusting The Web For Fingerprinters," in *Proceedings of the ACM SIGSAC Conference on Computer & Communications Security*, 2013.

[2] M. Bailey, J. Oberheide, J. Andersen, Z. M. Mao, F. Jahanian, and J. Nazario, "Automated Classification And Analysis Of Internet Malware," in *Recent advances in intrusion detection*. Springer, 2007, pp. 178-197.

[3] A. Blum, B. Wardman, T. Solorio, and G. Warner, "Lexical Feature Based Phishing URL Detection Using Online Learning," in *Proceedings of the ACM Workshop on Artificial Intelligence and Security*, 2010.

[4] D. Canali, M. Cova, G. Vigna, and C. Kruegel, "Prophiler: A Fast Filter For The Large-Scale Detection Of Malicious Web Pages," in *Proceedings of the Conference on World Wide Web*, 2011.

[5] M. Cova, C. Kruegel, and G. Vigna, "Detection And Analysis Of Drive-By-Download Attacks And Malicious JavaScript Code," in *Proceedings of the Conference on World Wide Web*, 2010.

[6] G. De Maio, A. Kapravelos, Y. Shoshitaishvili, C. Kruegel, and G. Vigna, "PExy: The Other Side Of Exploit Kits," in *Proceedings of the Conference on Detection of Intrusions and Malware, and Vulnerability Assessment*, 2014.

[7] B. Eshete and V. N. Venkatakrishnan, "Webwinnow: Leveraging Exploit Kit Workflows To Detect Malicious Urls," in *Proceedings of the ACM Conference on Data and Application Security and Privacy*, 2014.

[8] J. Gassen and J. Chapman, "Honeyagent: Detecting Malicious Java Applets By Using Dynamic Analysis," in *Malicious and Unwanted Software: The Americas (MALWARE), International Conference on*, 2014.

[9] C. Grier, L. Ballard, J. Caballero, N. Chachra, C. J. Dietrich, K. Levchenko, P. Mavrommatis, D. McCoy, A. Nappa, A. Pitsillidis, N. Provos, M. Z. Rafique, M. A. Rajab, C. Rossow, K. Thomas, V. Paxson, S. Savage, and G. M. Voelker, "Manufacturing Compromise: The Emergence Of Exploit-As-A-Service," in *Proceedings of the ACM Conference on Computer and Communications Security*, 2012.

[10] L. Invernizzi, S. Benvenuti, P. M. Comparetti, M. Cova, C. Kruegel, and G. Vigna, "Evilseed: A Guided Approach To Finding Malicious Web Pages," in *Proceedings of the IEEE Symposium on Security and Privacy*, May 2012.

[11] D. Kirat, G. Vigna, and C. Kruegel, "Barebox: Efficient Malware Analysis On Bare-Metal," in *Proceedings of the 27th Annual Computer Security Applications Conference*, 2011, pp. 403-412.

[12] D. Kirat, G. Vigna, and C. Kruegel, "Barecloud: Bare-Metal Analysis-Based Evasive Malware Detection," in *Proceedings of the 23rd USENIX Conference on Security Symposium*, 2014, pp. 287-301.

[13] J. Kornblum, "Identifying Almost Identical Files Using Context Triggered Piecewise Hashing," *Digital Investigation*, vol. 3, Supplement, 2006.

[14] Z. Li, K. Zhang, Y. Xie, F. Yu, and X. Wang, "Knowing Your Enemy: Understanding And Detecting Malicious Web Advertising," in *Proceedings of the ACM Conference on Computer and Communications Security*, 2012.

[15] Z. Li, S. Alrwais, Y. Xie, F. Yu, and X. Wang, "Finding The Linchpins Of The Dark Web: A Study On Topologically Dedicated Hosts On Malicious Web Infrastructures," in *Proceedings of the IEEE Symposium on Security and Privacy*, May 2013.

[16] M. Lindorfer, C. Kolbitsch, and P. Milani Comparetti, "Detecting Environment-Sensitive Malware," in *Proceed-

[17] J. Ma, L. K. Saul, S. Savage, and G. M. Voelker, "Beyond Blacklists: Learning To Detect Malicious Web Sites From Suspicious URLs," in *Proceedings of the Conference on Knowledge Discovery and Data Mining*, 2009.

[18] J. Ma, L. K. Saul, S. Savage, and G. M. Voelker, "Learning To Detect Malicious URLs," *ACM Transactions on Intelligent Systems Technology*, vol. 2, no. 3, May 2011.

[19] G. Maier, R. Sommer, H. Dreger, A. Feldmann, V. Paxson, and F. Schneider, "Enriching Network Security Analysis With Time Travel," in *Proceedings of the ACM SIGCOMM 2008 Conference on Data Communication*. ACM, 2008.

[20] H. Mekky, R. Torres, Z.-L. Zhang, S. Saha, and A. Nucci, "Detecting Malicious HTTP Redirections Using Trees Of User Browsing Activity," in *Proceedings of IEEE INFOCOM*, April 2014.

[21] V. Paxson, "Bro: A System For Detecting Network Intruders In Real-Time," *Computer Networks*, vol. 31, no. 23-24, 1999.

[22] M. Polychronakis, K. G. Anagnostakis, and E. P. Markatos, "Comprehensive Shellcode Detection Using Runtime Heuristics," in *Annual Computer Security Applications Conference*, 2010.

[23] N. Provos, D. McNamee, P. Mavrommatis, K. Wang, and N. Modadugu, "The Ghost In The Browser Analysis Of Web-Based Malware," in *Proceedings of the Workshop on Hot Topics in Understanding Botnets*, 2007.

[24] N. Provos, P. Mavrommatis, M. A. Rajab, and F. Monrose, "All Your iFRAMEs Point To Us," in *Proceedings of the USENIX Security Symposium*, 2008.

[25] K. Rieck, T. Krueger, and A. Dewald, "Cujo: Efficient Detection And Prevention Of Drive-By-Download Attacks," in *Proceedings of the Computer Security Applications Conference*, 2010.

[26] M. Roesch et al., "Snort: Lightweight Intrusion Detection For Networks," in *LISA*, vol. 99, no. 1, 1999, pp. 229-238.

[27] J. Schlumberger, C. Kruegel, and G. Vigna, "Jarhead Analysis And Detection Of Malicious Java Applets," in *Proceedings of the 28th Annual Computer Security Applications Conference*. New York, N.Y., USA: ACM, 2012.

[28] K. Z. Snow, S. Krishnan, F. Monrose, and N. Provos, "Shellos: Enabling Fast Detection And Forensic Analysis Of Code Injection Attacks," in *20th USENIX conference on Security*, 2011.

[29] B. Stancill, K. Z. Snow, N. Otterness, F. Monrose, L. Davi, and A.-R. Sadeghi, Check My Profile: Leveraging Static Analysis for Fast and Accurate Detection of ROP Gadgets. Symposium on Recent Advances in Intrusion Detection, 2013.

[30] B. Stock, B. Livshits, and B. Zorn, "Kizzie: A Signature Compiler For Exploit Kits," Microsoft Research, Tech. Rep. MSR-TR-2015-12, February 2015.

[31] G. Stringhini, C. Kruegel, and G. Vigna, "Shady Paths: Leveraging Surfing Crowds To Detect Malicious Web Pages," in *Proceedings of the ACM Conference on Computer and Communications Security*, 2013.

[32] K. Thomas, E. Bursztein, C. Grier, G. Ho, N. Jagpal, A. Kapravelos, D. McCoy, A. Nappa, V. Paxson, P. Pearce, N. Provos, and M. A. Rajab, "Ad Injection At Scale: Assessing Deceptive Advertisement Modifications," in *IEEE Symposium on Security and Privacy*, 2015.

[33] T. Van Overveldt, C. Kruegel, and G. Vigna, "Flashdetect: Actionscript 3 Malware Detection," in *Proceedings of the 15th International Conference on Research in Attacks, Intrusions, and Defenses*. Springer-Verlag, 2012.

[34] D. Y. Wang, S. Savage, and G. M. Voelker, "Cloak And Dagger: Dynamics Of Web Search Cloaking," in *Proceedings of the 18th ACM Conference on Computer and Communications Security*, 2011.

[35] G. Wang, J. W. Stokes, C. Herley, and D. Felstead, "Detecting Malicious Landing Pages In Malware Distribution Networks," in *Proceedings of Dependable Systems and Networks*, 2013.

Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for detecting malicious network traffic, the method comprising:

caching, using a semantic content cache, network traffic transmitted between a client and a server, wherein the network traffic includes a uniform resource locator (URL) for accessing at least one file from the server, wherein caching, using the semantic content cache, the network traffic includes extracting and caching at least a first hypertext transfer protocol (HTTP) object at a network level of the semantic content cache and caching at least a second HTTP object at a client level of the semantic content cache, wherein the network level of the semantic content cache uses URLs for data retrieval and the client level of the semantic content cache uses Internet protocol (IP) addresses for data retrieval;

determining that the at least one file is suspicious; and in response to determining that the at least one file is suspicious, replaying the network traffic using an emulated client and an emulated server to determine whether the at least one file is malicious, wherein replaying the network traffic includes obtaining and using at least the first HTTP object from the semantic content cache using the URL and obtaining and using at least the second HTTP object from the semantic content cache using an IP address associated with the client.

2. The method of claim 1 wherein the network traffic includes HTTP requests and HTTP responses based on data from observed packets communicated between the client and the server.

3. The method of claim 1 wherein determining whether the at least one file is suspicious includes determining that the at least one file includes a portable document format (PDF) file, a Flash file, a Java file, a JavaScript file, a Silverlight file, a Microsoft Office file, a Microsoft Word file, an Microsoft Excel file, or a Microsoft PowerPoint file.

4. The method of claim 1 wherein determining whether the at least one file is suspicious includes:

determining that a Flash file or at least one function within the Flash file is not known to be benign.

5. The method of claim 1 wherein replaying the network traffic using the emulated client and the emulated server includes configuring the emulated client using client browser information from the network traffic and determining, from the network traffic, an originating request that triggers one or more events that yield the URL.

6. The method of claim 1 wherein replaying the network traffic includes:
receiving, by the emulated client, a response from the emulated server, wherein the response is based on a cached response from the server; and
monitoring, by the emulated client, effects of the response for identifying at least one malicious behavior.

7. The method of claim 6 wherein monitoring the effects of the response includes using a virtualized environment or application programming interface (API) hooks.

8. The method of claim 6 wherein the effects of the response includes programmatic behaviors of a payload of the response or changes to the emulated client's computing environment caused by the response.

9. The method of claim 6 wherein the at least one malicious behavior includes:
a process memory associated with the response contains a code injection or code reuse payload;
a process memory associated with the response exceeds a tunable threshold;
a process associated with the response terminates or crashes;
a process associated with the response uses a known anti-detection technique;
a process associated with the response spawns another process;
a process associated with the response downloads an executable file or a dynamic-linked library file;
a process associated with the response accesses a system registry or a system file;
a process associated with the response communicates with a non-application related host;
a process associated with the response accesses potentially sensitive information; or
a process associated with the response modifies system security settings.

10. A system for detecting malicious network traffic, the system comprising:
at least one processor;
a memory; and
a malicious traffic detection module (MTDM) implemented using the at least one processor and the memory, wherein the MTDM is configured to cache, using a semantic content cache, network traffic transmitted between a client and a server, wherein the network traffic includes a uniform resource locator (URL) for accessing at least one file from the server, wherein caching, using the semantic content cache, the network traffic includes extracting and caching at least a first hypertext transfer protocol (HTTP) object at a network level of the semantic content cache and caching at least a second HTTP object at a client level of the semantic content cache, wherein the network level of the semantic content cache uses URLs for data retrieval and the client level of the semantic content cache uses Internet protocol (IP) addresses for data retrieval, to determine that the at least one file is suspicious and in response to determining that the at least one file is suspicious, to replay the network traffic using an emulated client and an emulated server to determine whether the at least one file is malicious, wherein replaying the network traffic includes obtaining and using at least the first HTTP object from the semantic content cache using the URL and obtaining and using at least the second HTTP object from the semantic content cache using an IP address associated with the client.

11. The system of claim 10 wherein the network traffic includes HTTP requests and HTTP responses based on data from observed packets communicated between the client and the server.

12. The system of claim 10 wherein the MTDM is configured to determine that the at least one file is suspicious by determining that the at least one file includes a portable document format (PDF) file, a Flash file, a Java file, a JavaScript file, a Silverlight file, a Microsoft Office file, a Microsoft Word file, an Microsoft Excel file, or a Microsoft PowerPoint file.

13. The system of claim 10 wherein the MTDM is configured to determine that the at least one file is suspicious by:
determining that a Flash file or at least one function within the Flash file is not known to be benign.

14. The system of claim 10 wherein the MTDM is configured to configure the emulated client using client browser information from the network traffic and to determine, from the network traffic, an originating request that triggers one or more events that yield the URL.

15. The system of claim 10 wherein the emulated client is configured to receive a response from the emulated server, wherein the response is based on a cached response from the server, and to monitor effects of the response for identifying at least one malicious behavior.

16. The system of claim 15 wherein monitoring the effects of the response includes using a virtualized environment or application programming interface (API) hooks.

17. The system of claim 15 wherein the effects of the response includes programmatic behaviors of a payload of the response or changes to the emulated client's computing environment caused by the response.

18. The system of claim 15 wherein the at least one malicious behavior includes:
a process memory associated with the response contains a code injection or code reuse payload;
a process memory associated with the response exceeds a tunable threshold;
a process associated with the response terminates or crashes;
a process associated with the response uses a known anti-detection technique;
a process associated with the response spawns another process;
a process associated with the response downloads an executable file or a dynamic-linked library file;
a process associated with the response accesses a system registry or a system file;
a process associated with the response communicates with a non-application related host;
a process associated with the response accesses potentially sensitive information; or
a process associated with the response modifies system security settings.

19. A non-transitory computer readable medium having stored thereon executable instructions that when executed by a processor of a computer control the computer to perform steps comprising:

caching, using a semantic content cache, network traffic transmitted between a client and a server, wherein the network traffic includes a uniform resource locator (URL) for accessing at least one file from the server, wherein caching, using the semantic content cache, the network traffic includes extracting and caching at least a first hypertext transfer protocol (HTTP) object at a network level of the semantic content cache and caching at least a second HTTP object at a client level of the semantic content cache, wherein the network level of the semantic content cache uses URLs for data retrieval and the client level of the semantic content cache uses Internet protocol (IP) addresses for data retrieval;

determining that the at least one file is suspicious; and in response to determining that the at least one file is suspicious, replaying the network traffic using an emulated client and an emulated server to determine whether the at least one file is malicious, wherein replaying the network traffic includes obtaining and using at least the first HTTP object from the semantic content cache using the URL and obtaining and using at least the second HTTP object from the semantic content cache using an IP address associated with the client.

20. The non-transitory computer readable medium of claim 19 wherein the network traffic includes HTTP requests and HTTP responses based on data from observed packets communicated between the client and the server.

\* \* \* \* \*